United States Patent [19]
Kalsi et al.

[11] Patent Number: 5,305,839
[45] Date of Patent: Apr. 26, 1994

[54] TURBINE PUMP RING FOR DRILLING HEADS

[75] Inventors: Manmohan S. Kalsi, Houston; Patricio D. Alvarez, Richmond; Thomas F. Bailey; Larry F. Moeller, both of Houston, all of Tex.

[73] Assignee: Masx Energy Services Group, Inc., Houston, Tex.

[21] Appl. No.: 4,886

[22] Filed: Jan. 19, 1993

[51] Int. Cl.$^5$ ............................................. E21B 33/00
[52] U.S. Cl. ........................................ 175/162; 166/82
[58] Field of Search .............................. 175/162, 220; 166/82-86

[56] References Cited
U.S. PATENT DOCUMENTS 4,326,584  4/1982  Watkins .................................. 166/82
4,444,401  4/1984  Roche et al. ...................... 166/84 X Primary Examiner—Thuy M. Bui
Attorney, Agent, or Firm—Edgar A. Zarins; Malcolm L. Sutherland

[57] ABSTRACT

A drilling head for the controlled operation of the drill string while diverting well fluids from the well. The drilling head incorporates a kelly drive and at least one stripper rubber which rotate with the drill string extending through the drilling head. Rotation of the drive bushing and stripper rubber are controlled by bearings disposed in a bearing chamber of the drilling head through which lubricant is circulated to reduce friction and cool the bearings. A turbine ring attached to the lock nut ring of the kelly drive circulates lubricant through the bearing chamber as it rotates in association with the drive assembly of the drilling head. The turbine pump ring forces circulation of lubricant as the drive assembly rotates in addition to the circulation by the remove lubricant pump or in the event the remote pump fails to operate. The turbine ring includes a plurality of angular slots to force circulation of the lubricant as the drive assembly rotates.

11 Claims, 3 Drawing Sheets

TURBINE PUMP RING FOR DRILLING HEADS

BACKGROUND OF THE INVENTION

1. Field of the Invention

The present invention relates to a drilling head for the controlled operation of a drill string and, in particular, to a pump ring for maintaining circulation of lubricant through the bearing chamber of the drilling head.

2. Description of the Prior Art

Drilling heads are extensively used in drilling operations to prevent drilling fluids from flooding the rig floor by diverting such fluids. The drilling head typically incorporates at least one stationary or rotating stripper rubber which seals against the drill string to prevent drilling fluid from flowing through the axial passage of the drilling head. A drive assembly mounted in the upper end of the drilling head controls the rotation of the drill string and may include a kelly drive and a drive bushing. Associated with the drive assembly are bearings mounted in a bearing chamber. In order to lubricate the bearings while dissipating head generated in the operation of the drilling head, a remote lubricant pump and reservoir are mounted in fluid communication with the bearing chamber. Such lubricant systems typically include a supply line connected to the drilling head at one end of the bearing chamber and a return line connected to the other end of the chamber forming a lubricant circulation path. Lubricant pumped to the bearing chamber, lubricates and cools the bearings and returns to the reservoir.

Circulation of lubrication fluids is dependent upon continuous operation of the pump associated with the lubricant supply. However, if the pump fails or becomes clogged, lubricant supply will be interrupted resulting in damage to the bearings or more extensively to the drilling head. While the bearings are replaceable, repair of the drilling head and the associated downtime can add significantly to the cost of drilling operations. One solution is the addition of a back-up pump or an alarm system which signals the interruption of lubricant flow. However, these alternatives also add to the cost of drilling operations.

SUMMARY OF THE PRESENT INVENTION

The present invention overcomes the disadvantages of the prior known drilling heads by providing an internal pump ring which maintains circulation of the lubricant in the event of pump failure while also enhancing circulation during normal operation of the lubricant system.

The drilling head embodying the present invention includes an upper drive assembly incorporating a drive bushing and a drive ring rotatably mounted in the drilling head. The stripper rubber is preferably connected to the drive bushing for rotation therewith. The bearing assembly is mounted in the annulus chamber between the drive ring and the outer wall of the housing. Typically, roller bearings are utilized to rotatively support the drive assembly. Appropriate seals are seated at the upper and lower ends of the bearing chamber to enclose the bearings. A lock nut ring attached to the drive ring positionally captures the bearings within the chamber.

Mounted to the lock nut ring is a turbine pump ring which forces circulation of lubricant through the bearing chamber as the pump ring and lock nut ring rotate. The pump ring includes an annular sleeve having a mounting flange integrally formed therewith. The outer face of the sleeve has a plurality of grooves formed therein. The grooves are formed at an angle to create the flow of lubricant. Unlike the typical circulation system which has separate inlet and outlet lines, the lubricant system of the present invention joins the inlet and outlet lines to a single supply line thereby forming a circuitous lubricant path. As a result, even when lubricant is not being supplied by the pump, the internal pump ring will maintain circulation of lubricant through the bearing chamber and exteriorly of the drilling head thereby allowing cooling of the lubricant.

Other objects, features and advantages of the invention will be apparent from the following detailed description taken in connection with the accompanying drawings.

BRIEF DESCRIPTION OF THE DRAWINGS

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
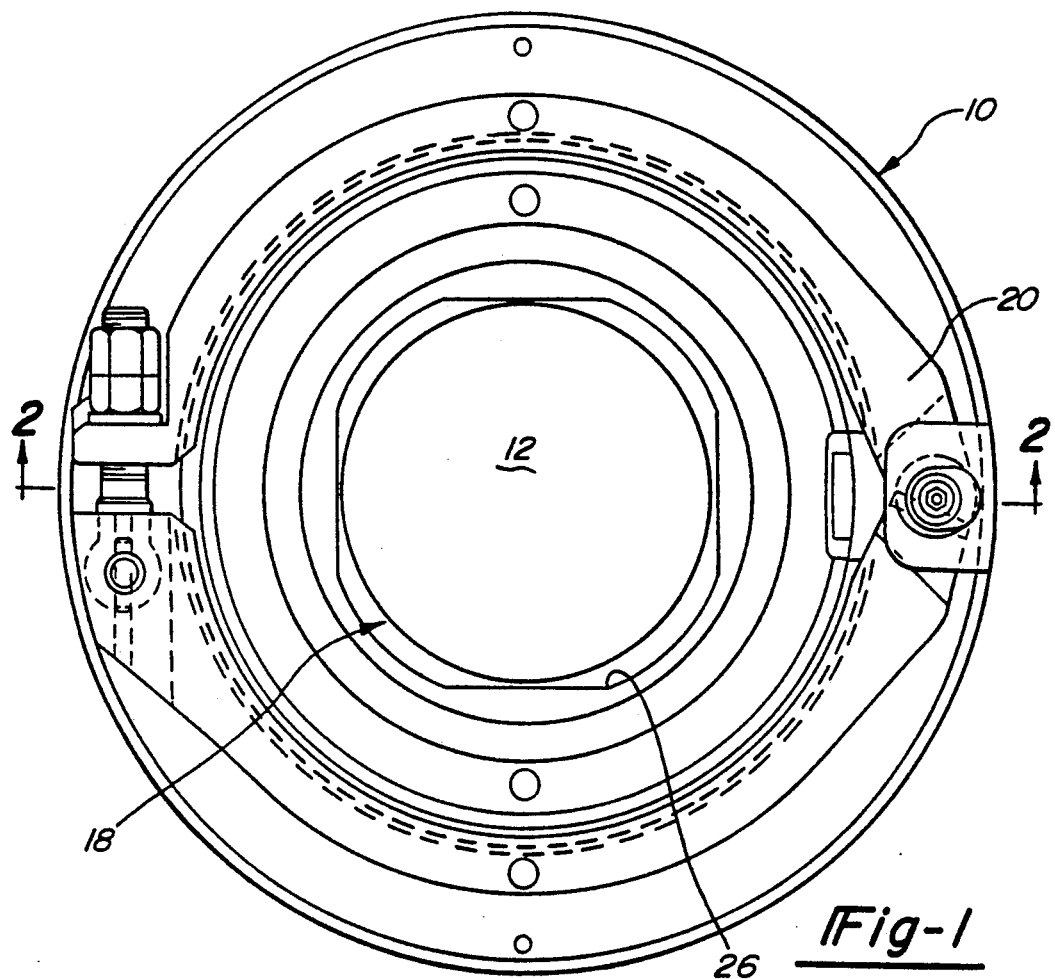
FIG. 1 is a top view of a drilling head embodying the internal pump ring of the present invention.
Figure 3:
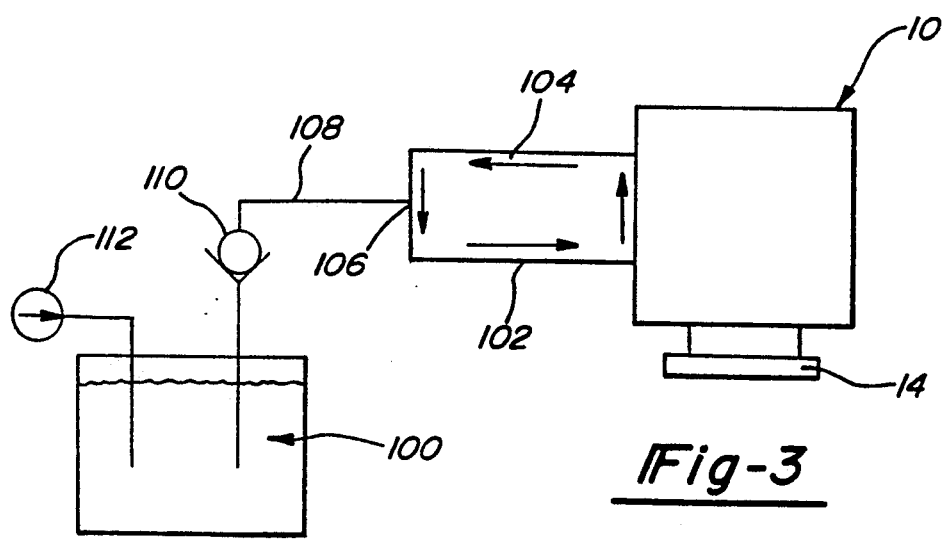
FIG. 3 is a schematic diagram of the lubricant circulation system of the present invention.
Figure 2:
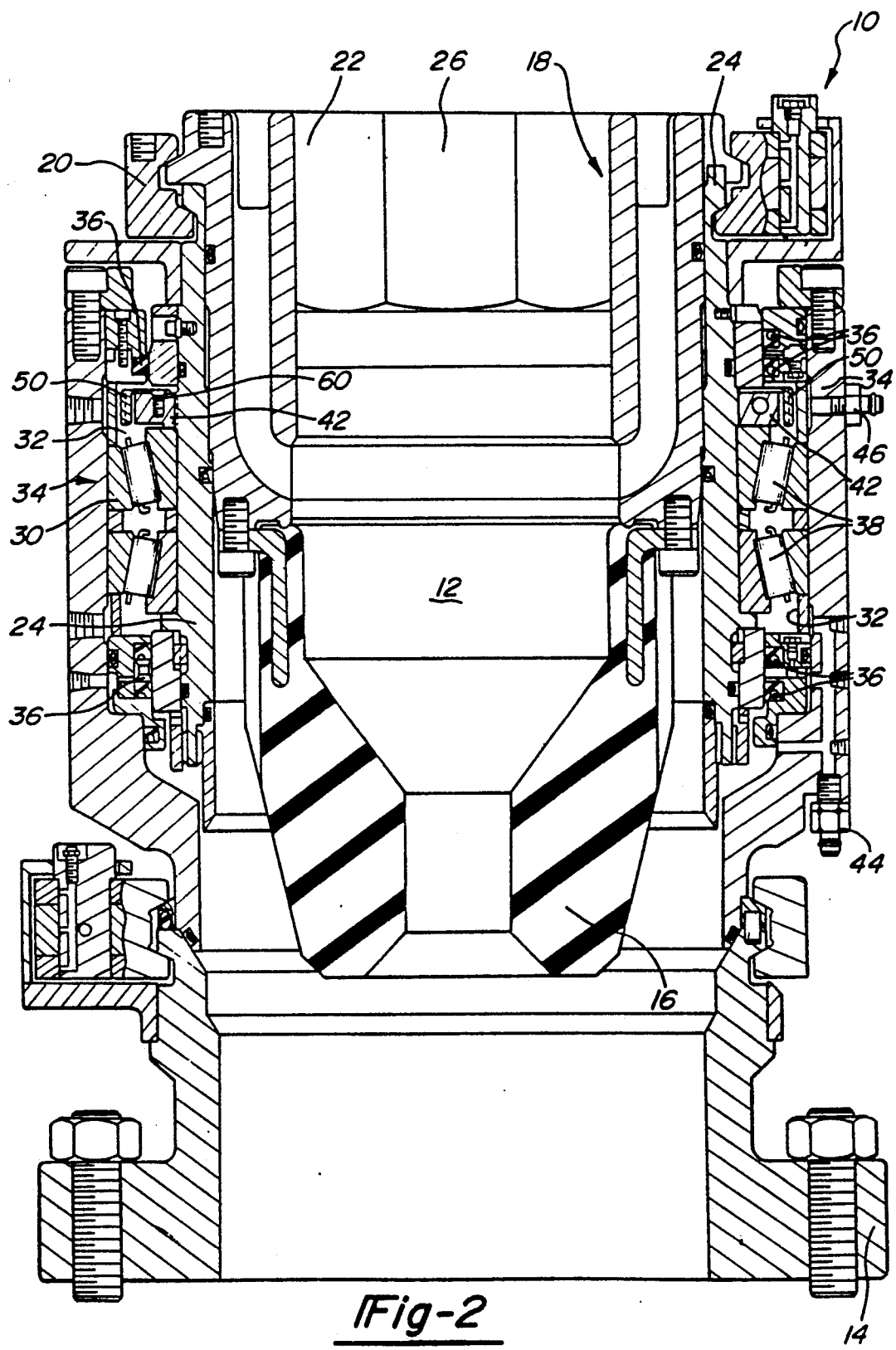
FIG. 2 is a cross-sectional perspective of the drilling head taken along lines 2—2 of FIG. 1.
Figure 4:
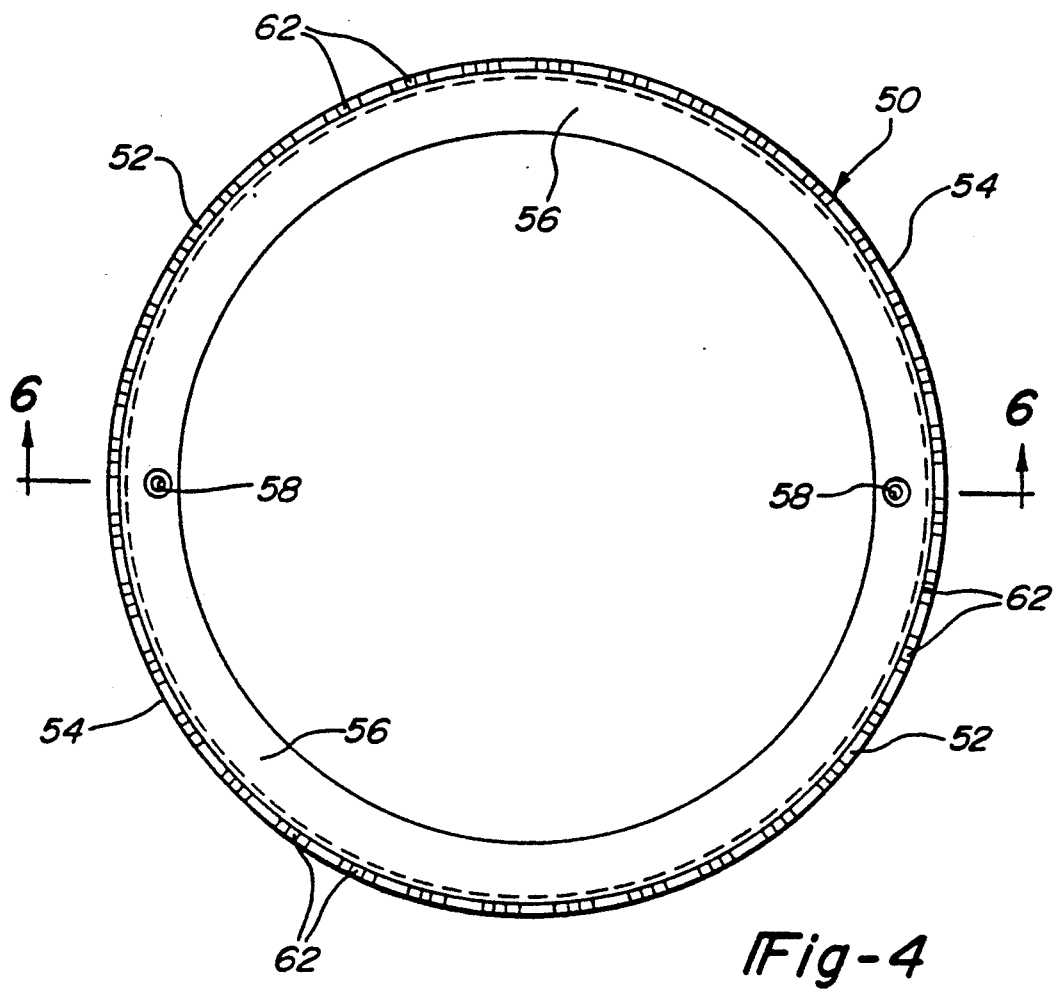
FIG. 4 is a plan view of the internal pump ring of the present invention.
Figure 5:
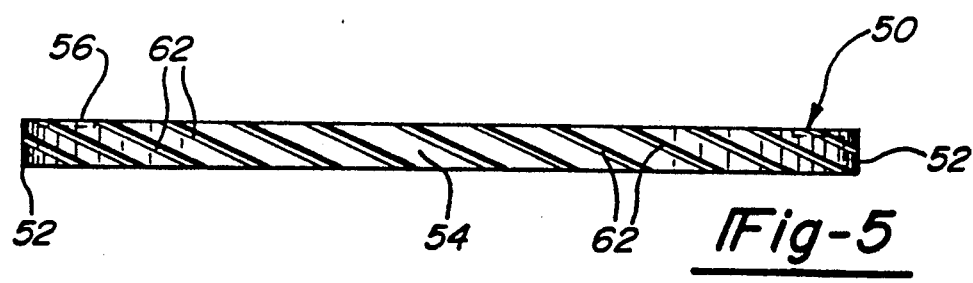
FIG. 5 is a side plan view of the pump ring.
Figure 6:
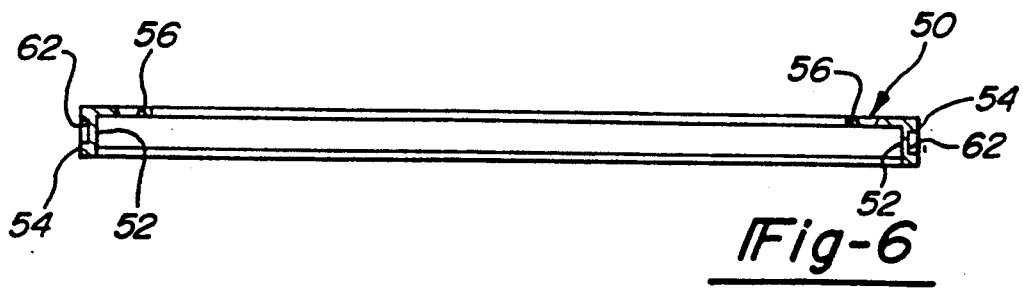
FIG. 6 is a cross-sectional perspective of the pump ring taken along lines 6—6 of FIG. 4.

Referring first to FIGS. 1 through 3, there is shown a drilling head 10 for controlled rotational and axial deployment of a drill string which extends through the axial passageway 12 of the drilling head 10 into the wellbore. The drilling head 10 is typically mounted to the BOP stack below the floor of the drilling rig using the bolt flange 14. At least one stripper rubber 16 sealingly engages the drill string to prevent drilling fluids from the wellbore from flooding the rig floor. The stripper rubber 16 diverts the flow of drilling fluid to a side outlet of the drilling head 10. The stripper rubber 16 is preferably connected to a drive assembly 18 removably mounted within the upper end of the drilling head 10. The drive assembly 18 and stripper rubber 16 are designed to rotate within the drilling head 10 in conjunction with the drill string extending therethrough. The drive assembly 18 and the rotatable stripper rubber 16 connected thereto are removably maintained within the drilling head 10 by a clamp assembly 20.

Referring now to FIG. 2, the drive assembly 18 preferably includes a drive bushing 22 having the stripper rubber 16 attached to its lower end and a drive ring 24 drivably connected to the drive bushing 22. Thus, the drive bushing 22, the drive ring 24 and the stripper rubber 16 rotate within the drilling head 10. The drive bushing 22 preferably includes an inner hexagonal surface 26 for rotation with a kelly drive of the drill string.

A bearing assembly 30 is incorporated into the drilling head 10 to rotatably support the drive assembly 18.

The bearing assembly 30 is disposed within a bearing chamber 32 formed by the annulus between the drive ring 24 and the outside wall 34 of the drilling head 10. The bearing chamber 32 is closed at the upper and lower ends by a series of seals 36 thereby forming a closed chamber. The bearing assembly 30 includes, at least in part, roller bearings 38 mounted between the outer wall 34 and the drive ring 24 to rotatably support the drive assembly 18. The roller bearings 38 are positionally captured within the chamber 32 between lower shoulder 40 formed as part of the drive ring 24 and lock nut ring 42 which is threadably mounted to the drive ring 24. Removal of the lock nut ring 42 facilitates removal of the bearings 38 if necessary.

Referring to FIGS. 2 and 3, in order to maintain proper lubrication of the bearing assembly 30 and dissipate the heat generated by the bearings 38, lubricant is pumped through the bearing chamber 32 from an external lubricant source 100. The drilling head 10 includes inlet nipple 44 and outlet nipple 46 in communication with the bearing chamber 32. Supply line 102 is connected to the inlet nipple 44 and return line 104 is connected to the outlet nipple 46 for circulation of lubricant through the chamber 32. In the typical prior known lubrication systems the supply and return lines were independently in communication with the lubricant reservoir. The lubrication system of the present invention connects the supply line 102 and the return line 104 at the T-connector 106 which communicates with a main line 108. As a result, the supply line 102, the return line 104 and the bearing chamber 32 create circuitous lubricant path which communicates with main line 108 to supply additional lubricant as needed. A flow control valve 110 is disposed in the main line 108 which is in direct communication with the lubricant reservoir 100. An air operated pump 112 forces air into the lubricant reservoir 100 which forces lubricant into line 108 and the bearing chamber 32.

The circuitous lubricant path facilitates circulation of lubricant through the bearing chamber 32 in accordance with the present invention even when the pump 112 is not or fails to operate. As best shown in FIGS. 2 and 4-6, circulation of lubricant is maintained by a turbine pump ring 50 rotatably disposed within the bearing chamber 32. In a preferred embodiment of the invention, the pump ring 50 is mounted to the lock nut ring 42 which is connected to the drive ring 24. Thus, the pump ring 50 will rotate with the drive assembly 18 in accordance with operation of the drilling head 10. The pump ring 50 includes a sleeve wall 52 having an outer face 54 and a mounting flange 56 formed perpendicular to the sleeve wall 52. The mounting flange 56 includes a plurality of apertures 58 adapted to receive a fastener 60 for mounting the pump ring 50 to the lock nut ring 42. Formed in the outer face 54 of the pump ring 50 are a plurality of parallel grooves 62 which generate circulation of lubricant as the pump ring 50 rotates within the bearing chamber 32. Preferably, the grooves 62 are formed at an angle to the axis of the pump ring 50 in order to generate the circulation of lubricant.

The turbine pump ring 50 ensures circulation of lubricant through the bearing chamber 32 during operation of the drilling head 10 even if lubricant is not being pumped from the reservoir 100. In addition, during normal operation of the lubricant system, the pump ring 50 enhances circulation of lubricant. It has been found that the inclusion of the pump ring 50 causes lubricant to circulate through the circuitous lubricant path and the bearing chamber 32 resulting in a 20° F. reduction in lubricant temperature as the lubricant flow.

The foregoing detailed description has been given for clearness of understanding only and no unnecessary limitations should be understood therefrom as some modification will be obvious to those skilled in the art without departing from the scope and spirit of the appended claims.

We claim:

1. In a drilling head having a drive assembly selectively rotatable with a drill string extending through the drilling head, a sealed chamber disposed in the drilling head, and lubricant supply means in fluid communication with the sealed chamber, the improvement comprising:

a pump ring rotatably disposed within the sealed chamber to circulate lubricant through the sealed chamber, said pump ring attached to the drive assembly for rotation therewith.

2. The improvement as defined in claim 1 wherein said pump ring includes an annular mounting flange and an integral sleeve portion having an outer face, a plurality of parallel grooves formed in said outer face for circulating lubricant within said sealed chamber as said pump ring rotates with the drive assembly.

3. The improvement as defined in claim 2 wherein said grooves in said outer face of said pump ring are disposed at an obtuse angle to the axis of rotation of said pump ring.

4. The improvement as defined in claim 1 wherein the lubricant supply means includes a supply line and a return line in fluid communication with the sealed chamber, said pump ring circulating lubricant through said chamber from said supply line into said return line of the lubricant supply means.

5. The improvement as defined in claim 3 wherein said supply line and said return line are in direct communication exteriorly of the drilling head thereby forming a circuitous lubricant path through said sealed chamber and said supply and return lines.

6. The improvement as defined in claim 4 wherein said circuitous lubricant path communicates with a lubricant reservoir for supplying lubricant to said sealed chamber.

7. In a drilling head having a drive assembly selectively rotatable with a drill string extending through the drilling head, a bearing assembly disposed in a bearing chamber and rotatably supporting the drive assembly, and lubricant supply means in fluid communication with the bearing chamber, the improvement comprising a pump ring rotatably disposed within the bearing chamber to circulate lubricant through the bearing chamber upon rotation of said drive assembly, said pump ring connected to a lock nut ring of said drive assembly for rotation with the drive assembly, said pump ring including an outer face with a plurality of pump grooves formed therein.

8. The improvement as defined in claim 6 wherein said pump ring comprises a sleeve portion having said outer face and an integral mounting flange perpendicular to said sleeve portion, said sleeve portion formed coaxial to the axis of rotation and said mounting flange connecting said pump ring to said lock nut ring.

9. The improvement as defined in claim 6 wherein said lubricant supply means includes a supply line and a return line in fluid communication with the bearing chamber, said supply line and return line connected in direct communication exteriorly of the drilling head to form a circuitous lubricant path, said pump ring circulating lubricant through the bearing chamber from said supply line into said return line of the lubricant supply means.

10. The improvement as defined in claim 9 wherein said circuitous lubricant path communicates with a lubricant reservoir for supplying lubricant to said bearing chamber.

11. A turbine pump ring for circulating lubricant through a bearing chamber of a drilling head, the drilling head including a drive assembly rotatably supported by a bearing assembly disposed in the bearing chamber, said pump ring comprising:

a sleeve portion having an outer face and a mounting flange integrally formed with said sleeve portion, said sleeve portion formed coaxial to the axis of rotation of said pump ring, said integral mounting flange formed perpendicular to said sleeve portion, said pump ring including a plurality of grooves formed in the outer face thereof for circulating lubricant through said bearing chamber as said pump ring rotates.

* * * * *